US006854038B2

United States Patent
Micka et al.

(10) Patent No.: US 6,854,038 B2
(45) Date of Patent: Feb. 8, 2005

(54) GLOBAL STATUS JOURNALING IN NVS

(75) Inventors: William Frank Micka, Tucson, AZ (US); Gail Andrea Spear, Tucson, AZ (US); Warren Keith Stanley, Tucson, AZ (US); Sam Clark Werner, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 10/163,833

(22) Filed: Jun. 6, 2002

(65) Prior Publication Data

US 2003/0229754 A1 Dec. 11, 2003

(51) Int. Cl.[7] .............................................. G06F 12/00
(52) U.S. Cl. ........................ 711/156; 711/162; 711/112; 711/103; 714/15; 714/13; 714/20; 714/21
(58) Field of Search ................................ 711/112, 156, 711/161, 162, 103; 714/15, 13, 20, 21

(56) References Cited

U.S. PATENT DOCUMENTS

| | | | | | |
|---|---|---|---|---|---|
| 4,680,700 | A | * | 7/1987 | Hester et al. ............... | 711/206 |
| 4,713,755 | A | * | 12/1987 | Worley et al. .............. | 711/123 |
| 4,905,196 | A | * | 2/1990 | Kirrmann .................... | 365/200 |
| 5,043,871 | A | * | 8/1991 | Nishigaki et al. ........... | 707/202 |
| 5,581,726 | A | * | 12/1996 | Tanaka ........................ | 711/134 |
| 5,671,390 | A | * | 9/1997 | Brady et al. ................. | 711/113 |
| 5,734,895 | A | * | 3/1998 | Matsuo ........................ | 707/202 |
| 5,758,054 | A | * | 5/1998 | Katz et al. ..................... | 714/22 |
| 5,835,940 | A | * | 11/1998 | Yorimitsu et al. ........... | 711/112 |
| 6,148,383 | A | * | 11/2000 | Micka et al. ................. | 711/162 |

FOREIGN PATENT DOCUMENTS

EP        690379 A2 *  1/1996   ........... G06F/11/10

* cited by examiner

Primary Examiner—Hong Kim
(74) Attorney, Agent, or Firm—Scully, Scott, Murphy & Presser; Jean M. Barkley

(57) ABSTRACT

A method and system for updating status information in a persistent storage. The method comprises the steps of defining a table in persistent storage (NVS) for holding information about changes to the status information; and when that status information is changed, making an entry in the table to record the changed information. A task is initialized to update the information on the disk drive. This updating is done by (i) checking the table to determine if any changes have been recorded in the persistent storage, and (ii) if any changes have been recorded in the persistent storage, then copying the status information from the persistent storage to the disk drive.

18 Claims, 4 Drawing Sheets

GLOBAL STATUS JOURNALING IN NVS

BACKGROUND OF THE INVENTION

1. Field of the Invention

This invention generally relates to methods and systems for updating control or configuration data in a persistent storage.

2. Prior Art

Many computer systems, such as many main frame computer systems, use direct access storage devices (DASD) to store data. Indeed, because of the vast amount of data stored in these systems, many of these computer systems include a controller, separate from the main, or host, computer, to manage the DASD. These controllers, which themselves may include one or more processing units, act in response to commands or instructions from the host computer to control and configure the DASD and the data stored thereon. The information describing the status of the DASD is referred to as global status (GS) information, and this information may change over time, for example in response to commands or instructions from the host computer. It is important that this global status information be maintained across various error conditions, including the loss of power.

The Global Status information is organized by Logical Subsystem (LSS), with a separate Global Status area for each LSS. Each Global Status area contains all the information for the LSS. Some of this data is related to the state of the each device, some is related to the Copy Services (CS) sessions that exist in the LSS, etc.

There is a copy of this entire structure maintained in local storage. Whenever any of this information changes, it must be updated in some nonvolatile location. In current implementations, this may be accomplished by updating the local copy in memory and then writing the entire structure for the LSS to DASD. The operation that initiated the status change is not considered to be complete until this write is complete. Since writing to DASD requires a long time, this method causes long delays in the completion of operations which require a GS update. When there are many updates for different devices in the same LSS, each one writes the same Global Status structure and the operations are unnecessarily serialized, causing even longer delays in their completion. For example, if 100 FlashCopy establishes are done on 100 volumes in the same LSS, the same global status track will be written 100 times.

SUMMARY OF THE INVENTION

An object of this invention is to improve systems and methods for updating global status information in DASD.

Another object of the invention is to temporarily write global status change information to a buffer in non-volatile storage and then asynchronously write the global status information from the non-volatile storage to disk drives.

These and other objectives are attained with a method and system for updating status information in a persistent storage. The method comprises the steps of defining a table in persistent storage (NVS) for holding information about changes to the status information; and when that status information is changed, making an entry in the table to record the changed information. A task is initialized to update the information on the disk drive. This updating is done by (i) checking the table to determine if any changes have been recorded in the persistent storage, and (ii) if any changes have been recorded in the persistent storage, then copying the status information from the persistent storage to the disk drive.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
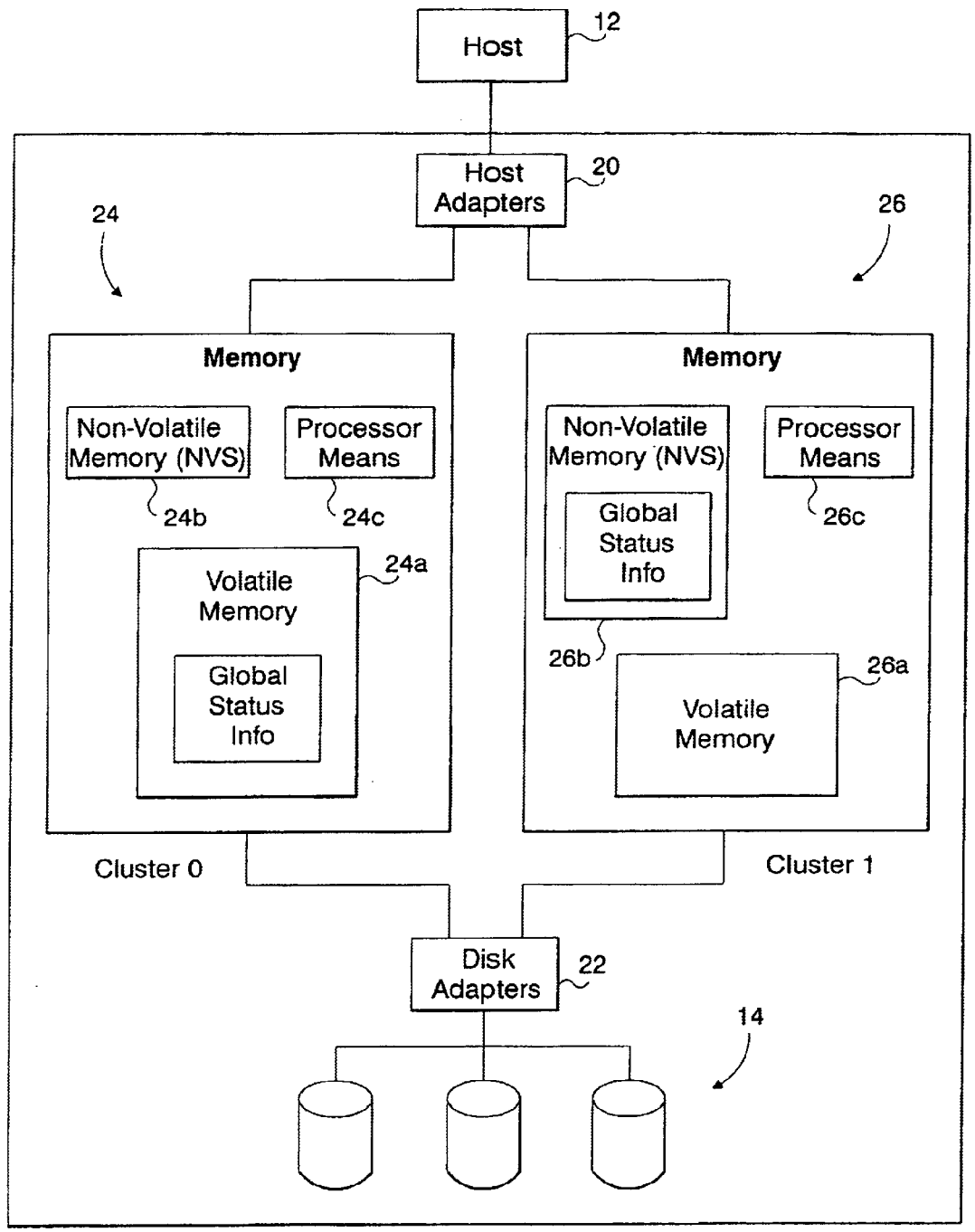
FIG. 1 is a block diagram of a computer system in which the present invention may be used.

FIG. 1 shows a computer system 10 generally comprising a host computer or computer system 12, data storage devices 14, and storage control 16. Preferably, storage control 16 includes host adapters 20, disk adapters 22, and first and second memory clusters 24 and 26. Memory cluster 24 includes volatile memory area 24a, non-volatile memory area 24b and processor means 24c. Similarly, memory cluster 26 includes volatile memory area 26a, non-volatile memory area 26b and processor means 26c. Plural memory clusters are provided in system 10, it may be noted, to provide redundancy in the storage controller 16, and preferably these memory clusters are connected to different power sources.

Many types of host computers or host computer systems may be used with the present invention. For instance, the host computer may be a main frame computer. The present invention can also be used, for example, with servers, work stations, and multiple computer systems. The World Wide Web may also be used as host computer 12.

Similarly, many types of data storage devices 14 can be used in the practice of this invention. The storage devices may be, or include, for example, disk drives, optical disks, CDs, or other data storage devices.

Also, as will be understood by those of ordinary skill in the art, any suitable types of adapters 20 and 22 may be used in controller 16. These adapters are used to insure that data and messages are in the proper format as they pass between host computer 12 and memory clusters 24 and 26 and between these memory clusters and storage devices 14. These adapters may be used, if desired, to provide other services. Many suitable adapters are well known in the art.

Processor means 24c and 26c are used to manage the memory clusters 24 and 26. These processors may also be used to provide additional features such as monitoring, repair, service, or status access. Any suitable processor means may be used to provide the necessary or desired functions.

In the operation of system 10, controller 12 is used to control and to configure storage devices 14 and the data thereon. In this operation, these controllers 12 use information, referred to as global status information, that describes the status and condition of the storage devices. With the embodiment of the system 10 illustrated in FIG. 1, a copy of this global status information is kept in each memory cluster and a copy is also kept in the storage devices 14. Whenever a change is made to this global status information, these copies need to be updated.

As mentioned above, in current systems, this may be accomplished by updating the local copy in memory and then writing the entire structure to the secondary storage disks. The operation that initiated the status change is not considered to be complete until this write is complete. Since writing to secondary storage discs requires a long time, this method causes long delays in the completion of operations that require an update. When there are many updates for different devices in the same specific disc area, each one writes the same change information and the operations are unnecessarily serialized, causing even longer delays in their completion. For example, if 100 changes are done on 100 volumes in the same specific disk area, the same change information will be written 100 times.

The present invention utilizes the fact that writing to non-volatile storage (NVS) is performed at electronic speeds and is much faster than writing to the physical drive. The amount of space available in the NVS is less than the total amount of global status information that must be maintained, so it is not possible to maintain the entire global status with the NVS. Instead, the NVS is used to store only the data that is actually modified and this data is written to the secondary storage as soon as possible, so that the amount of NVS space used by the journal at any one time is minimized. This is accomplished by defining a Global Status Journal Table within the NVS. Whenever a status update is required, an entry is made into this table describing the changed data, in addition to making the update in the local memory structure. As soon as the journal update is complete, the data are considered to be hardened and the operation complete from the client's viewpoint A task is then initiated to collect the updates for each LSS and write them to the secondary storage disks. When the write to the secondary storage disks has completed, the corresponding journal entries are removed from the NVS.

If, at the time of a global status update, there is no space available in the journal to add a new entry, then preferably, the update is written directly to the secondary storage disks.

Figure 2:
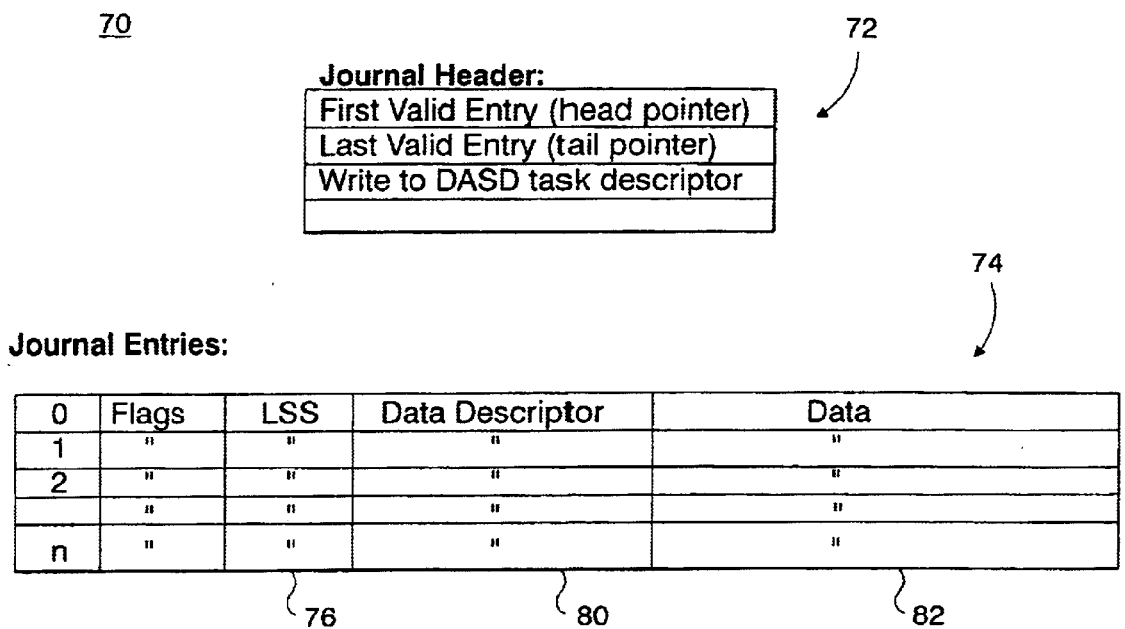
FIG. 2 shows a journal table used in the preferred implementation of the invention.

Preferably, as illustrated in FIG. 2, the journal table 70 is comprised of a header 72 that describes the valid entries in the table, followed by an array 74 of journal entries.

The LSS field 76 identifies which global status track is being updated. The Data Descriptor field 80 describes which part of the global status track was modified, and this field may have multiple parts to fully define the field that has been updated. For example, if it is a device status field being updated, the modifier will also contain the device address; if it is related to a particular session, then it will also contain the session id, and so forth. The Data field 82 contains the actual data to be stored in the location defined by the Data Descriptor. If a single operation updates multiple fields in the global status structure, then it will result in the creation of multiple journal entries.

Figure 3:
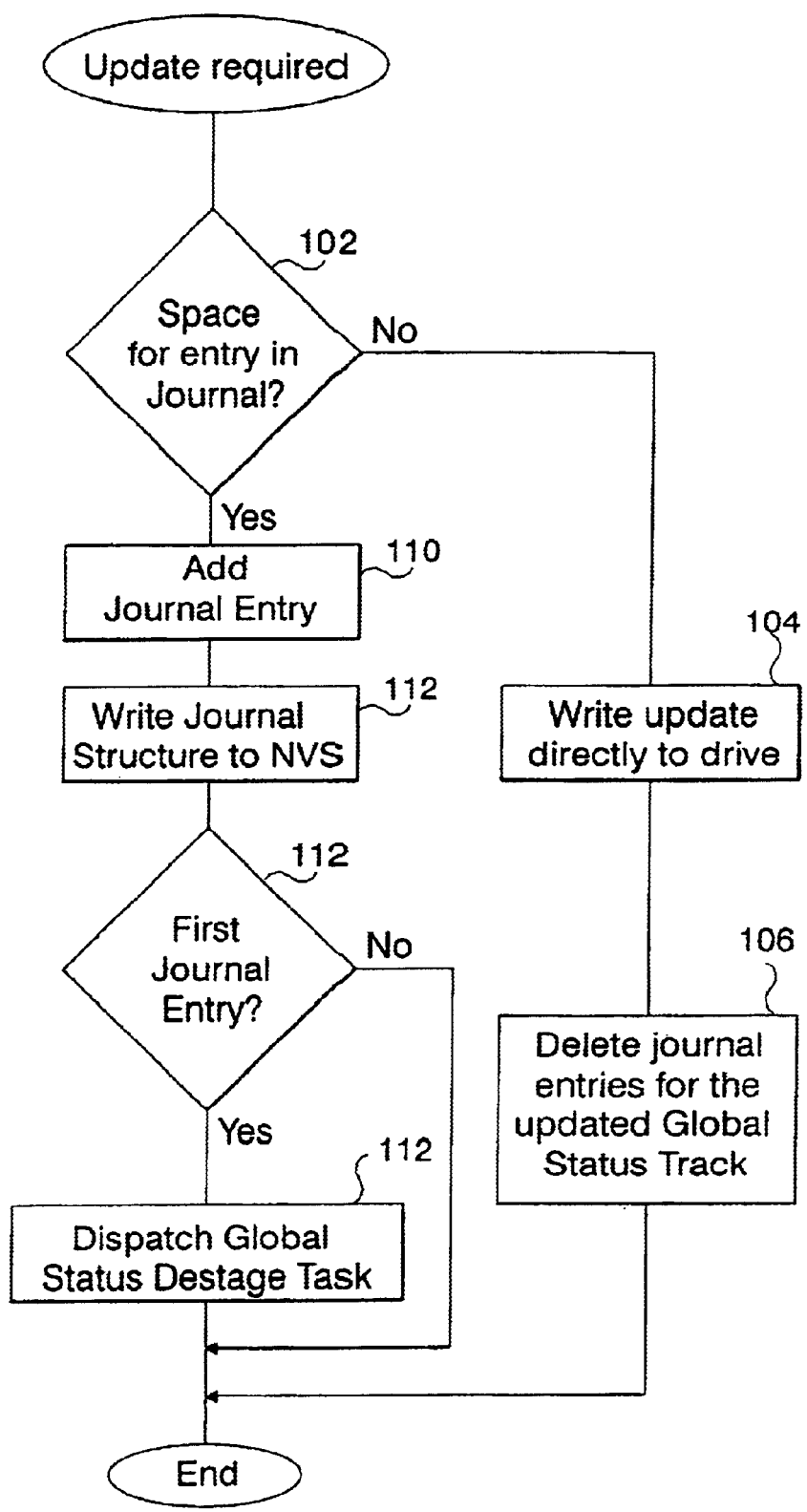
FIG. 3 is a flow chart illustrating a procedure for making entries into the journal table of FIG. 2.

With reference to FIG. 3, when a global status update is made, the head and tail pointers in the header area are inspected to determine, at step 102, if there is space in the journal for a new entry. If space is not available, then at step 104 a task is initiated to write the update directly to the secondary storage disks. (It is anticipated that this will happen rarely, if ever.) After step 104, the journal entries for the updated Global Status Track are deleted at step 106. If, at step 102, there is space in the journal, the tail pointer is used to determine the next free entry and the data describing the change is written into the table at step 110; and at step 112, the appropriate update is made to the local memory structure. As represented by steps 114 and 116, if there is currently no task actively writing global status data to the secondary storage disks, then a task is initiated and its ID written into the Journal Header area. If there is already an active task, then no further action is required.

Figure 4:
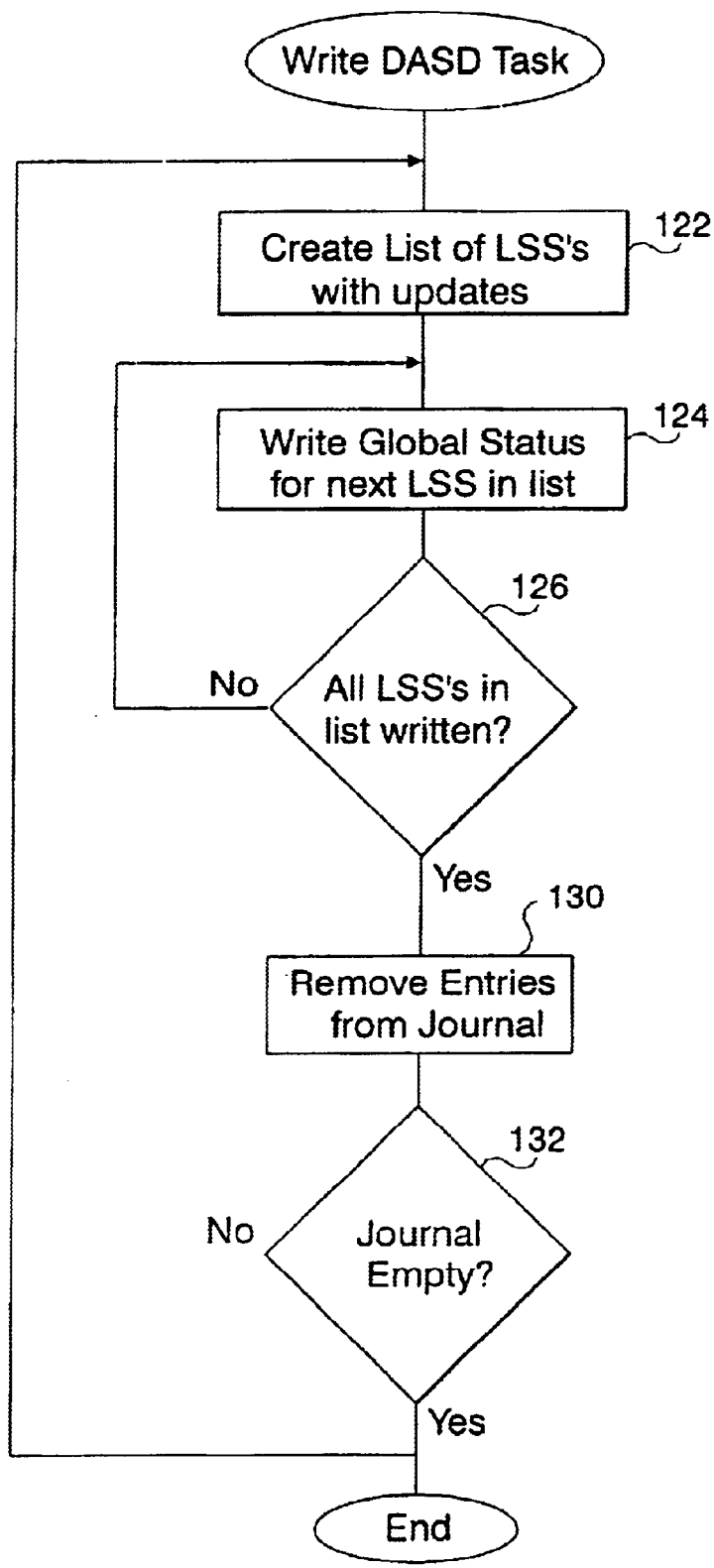
FIG. 4 is a flow chart showing how the journal entries may be used to update status information.

With reference to FIG. 4, when the Write to DASD task runs, it will take note of the first and last valid entries in the Journal. It will then, at step 122, build a list (in bitmap form) of all GS tracks (that is, LSS's) that have updates. As represented by steps 124 and 126, a task will be initiated to write the global status for each of the LSS's that have modified data. The entire global status structure that resides in memory is written to DASD. This structure contains the most current version of the data and thus includes all of the updates that are in the journal. In this way, in addition to the benefit of having the DASD writes performed asynchronous to the update operation, multiple updates can be written with only one write operation. The writes for each LSS may be performed either serially or in parallel. It should be noted that, since the entire local copy of each global status track is written, the Data Descriptor and Data fields of the Journal entries are not used for this operation.

When all of the DASD writes are complete, all Journal entries from the first and last valid entries (at the time that the DASD writes were initiated) are removed from the Journal at step 130. At step 132, the task determines whether the journal is empty. On the one hand, if no new entries were added after the time that the Write to DASD task started, then the Journal is now empty and the Write task is complete. On the other hand, if additional updates were made, then the head pointer is set to the first newly created entry in the Journal, effectively removing all entries that have been written to DASD. The Write to DASD task then picks up all the new modifications and makes another cycle of writing status tracks to DASD.

Modifications to this method may be made to have separate journal structures for each LSS (that is, for each global status track). The NVS area may be partitioned to have a separate area of each LSS and to have separate, independent processes to write the global status for each LSS.

As long as no incidents occur which lose or corrupt the global status information in the local memory area, there is no need to use the status information that resides in the Journal or on DASD. However, if the local memory copy is lost, for example due to a power loss, then this memory copy must be rebuilt, using the nonvolatile information that has been saved. In the current implementation, that is, without the Journaling of updates, this is done by simply reading the global status from DASD and using it to rebuild the status information in memory. With the above-described Journaling of the present invention, however, the DASD does not necessarily contain all of the updates because there may be information in the NVS journal that has not been written to DASD. A second step in the recovery is required.

Specifically, when it is determined that the global status information must be rebuilt, the global status tracks are first read from DASD into the local global status structures. Then, each Journal entry is processed, in order, and the update described by the Data Descriptor and Data fields applied to the global status structure. After all updates have been applied, then the state has been restored to the correct condition.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of updating status information in persistent storage, the method comprising:
    defining a table in said persistent storage (NVS) for holding information about changes to the status information;
    when the status information is changed, making an entry in the table to record the changed information;
    maintaining a header for the table, the header including pointers to the first and last entries in the table; and
    initializing a task to update the status information on a disk drive, including
        i) checking the table to determine if any changes have been recorded in the persistent storage, and
        ii) if any changes have been recorded in the persistent storage, then copying the status information from the persistent storage to the disk drive.

2. A method according to claim 1, further comprising the step of, after copying the status information to the disk drive, removing the entry from the table.

3. A method of updating status information in a persistent storage, the method comprising:
    defining a table in said persistent storage (NVS) for holding information about changes to the status information;
    when the status information is changed, making an entry in the table to record the changed information; and
    initializing a task update the status information on a disk drive, including
        i) checking the table to determine if any changes have been recorded in the persistent storage, and
        ii) if any changes have been recorded in the persistent storage, then copying the status information from the persistent storage to the disk drive; and
    wherein the table includes a header area and an array of journal entries, the header area includes pointers to the first and last journal entries, each of the journal entries identifying changed information.

4. A system for updating status information in a persistent storage, the system comprising:
    a persistent storage (NVS) defining a table for holding information about changes to the status information; and
    a controller to make an entry in the table when the status information is changed to record the changed information; maintaining a header for the table, the header including pointers to the first and last entries in the table; and to initialize a task to update the information on the disk drive, by
        i) checking the table to determine if any changes have been recorded in the persistent storage, and
        iii) if any changes have been recorded in the persistent storage, then copying the status information from the persistent storage to the disk drive.

5. A system according to claim 4, wherein the controller, after copying the status information to the disk drive, removes the entry from the table.

6. A system according to claim 4, wherein the controller uses the journal entries to rebuild the status information in the volatile memory.

7. A method of updating a copy in a disk storage of status information in a memory area, the method comprising:
    defining a table for holding information about changes to the status information in the memory area;
    when the status information is changed, making an entry in the table to indicate that the status information has changed;
    maintaining a header for the table, the header including pointers to the first and last entries in the table; and
    initializing a task to update the copy of the status information in the disk storage, including
        i) checking the table to determine if changes have been made to the status information, and
        ii) if any changes have been made to the status information, then updating the copy of the status information in the disk storage to include said changes.

8. A method according to claim 7, wherein the updating step includes the step of copying the status information from the memory area into the disk storage to make a new copy of the status information in the disk storage.

9. A method according to claim 7, wherein each of the table entries also includes a respective subset of information identifying a change to the status information, and further comprising the step of using the subsets of information in the table entries to rebuild the status information in the memory area.

10. A method according to claim 7, wherein the memory area includes a non-volatile memory area, and said table is maintained in the non-volatile memory area.

11. A system for updating a copy in a disk storage of status information, the system comprising:
    a memory storage defining a table for holding information about changes to the status information; and
    a controller for making an entry in the table, when the status information is changed, to indicate that the status information has changed, to maintain a header for the table, the header including pointers to the first and last entries in the table; and to initialize a task to update the copy of the status information in the disk storage by (i) checking the table to determine if changes have been made to the status information, and (ii) if any changes have been made to the status information, then updating the copy of the status information in the disk storage to include said changes.

12. A system according to claim 11, wherein the controller updates the copy in the disk storage by copying the status information from the memory area into the disk storage to make a new copy of the status information in the disk storage.

13. A system according to claim 11, wherein each of the table entries also includes a respective subset of information representing a change to the status information, and the controller uses the subsets of information in the table entries to rebuild the status information in the memory area.

14. A system according to claim 11, wherein the memory area includes a non-volatile memory area, and said table is maintained in the non-volatile memory area.

15. A program storage device readable by machine, tangibly embodying a program of instructions executable by the machine to perform method steps for updating a copy in a disk storage of status information in a memory area, said method steps comprising:
    defining a table for holding information about changes to the status information in the memory area;

when the status information is changed, making an entry in the table to indicate that the status information has changed;

maintaining a header for the table, the header including pointers to the first and last entries in the table; and initializing a task to update the copy of the status information in the disk storage, including
- i) checking the table to determine if changes have been made to the status information; and
- ii) if any changes have been made to the status information, then updating the copy of the status information in the disk storage to include said changes.

16. A program storage device according to claim 15, wherein the updating step includes the step of copying the status information from the memory area into the disk storage to make a new copy of the status information in the disk storage.

17. A program storage device according to claim 15, wherein each of the table entries also includes a respective subset of information identifying a change to the status information, and said method steps further comprise the step of using the subsets of information in the table entries to rebuild the status information in the memory area.

18. A program storage device according to claim 15, wherein the memory area includes a non-volatile memory area, and said table is maintained in the non-volatile memory area.

* * * * *

UNITED STATES PATENT AND TRADEMARK OFFICE
CERTIFICATE OF CORRECTION

PATENT NO. : 6,854,038 B2
DATED : February 8, 2005
INVENTOR(S) : William Frank Micka et al.

It is certified that error appears in the above-identified patent and that said Letters Patent is hereby corrected as shown below:

Column 3,
Line 3, "to the secondary storage disks" should read -- to the storage disks. --
Line 38, "to the secondary storage disks." should read -- to the storage disks. --

Column 5,
Line 32, "initializing a task update" should read -- initializing a task to update --
Line 57, "iii)" should read -- ii) --

Signed and Sealed this

Thirty-first Day of May, 2005

JON W. DUDAS
*Director of the United States Patent and Trademark Office*